(12) United States Patent
Yoshino et al.

(10) Patent No.: US 6,493,611 B2
(45) Date of Patent: Dec. 10, 2002

(54) VEHICLE CONTROLLER

(75) Inventors: Takahiro Yoshino, Yokosuka (JP); Yuki Nakajima, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/810,578

(22) Filed: Mar. 19, 2001

(65) Prior Publication Data

US 2001/0034571 A1 Oct. 25, 2001

(30) Foreign Application Priority Data

Apr. 6, 2000 (JP) ........................................ 2000-104497

(51) Int. Cl.⁷ .......................... F02N 11/06; B60K 41/02; B60L 11/00
(52) U.S. Cl. ........................... 701/22; 701/54; 180/65.2; 477/174
(58) Field of Search ................... 701/22, 54; 290/40 A, 290/40 R, 40 B, 40 C, 40 D, 40 F, 38 R, 45, 46; 180/65.2, 65.3, 65.8; 477/3, 5, 174, 175; 318/8, 9, 34, 51

(56) References Cited

U.S. PATENT DOCUMENTS

| | | | |
|---|---|---|---|
| 5,650,931 A | * 7/1997 | Nii | 364/424.026 |
| 5,936,312 A | * 8/1999 | Koide et al. | 290/40 R |
| 6,167,339 A | * 12/2000 | Pels | 701/54 |
| 6,190,282 B1 | * 2/2001 | Deguchi et al. | 477/5 |
| 6,190,283 B1 | * 2/2001 | Uchida | 477/5 |
| 6,233,508 B1 | * 5/2001 | Deguchi et al. | 701/22 |
| 6,291,903 B1 | * 9/2001 | Horibe | 290/40 A |

FOREIGN PATENT DOCUMENTS

JP      2000-236602      8/2000

\* cited by examiner

*Primary Examiner*—Tan Nguyen
*Assistant Examiner*—Dalena Tran
(74) *Attorney, Agent, or Firm*—Foley & Lardner

(57) ABSTRACT

Torque control of an electrical motor 4 connected to a drive shaft 6 and control of the rotation speed of a generator 2 supplying electrical power to the electrical motor 4 are performed in response to the running conditions of a vehicle. The actual generator output of the generator 2 is estimated at a given time and the drive output of the electrical motor 4 is limited in response to the estimated generator output. The drive output of the electrical motor 4 is limited in response to increases in consumed energy and reductions in the generated output of the generator 2 resulting from increases in the kinetic energy of rotating components of the engine 1 or the generator 2 during acceleration. Thus the difference of the generated output of the generator 2 and the consumed electrical power of the electrical motor 4 can be reduced during acceleration and it is possible to reduce the capacity of the battery supplying auxiliary electrical power.

14 Claims, 8 Drawing Sheets

VEHICLE CONTROLLER

FIELD OF THE INVENTION

The present invention relates to a control device for a vehicle provided with an engine, a generator and an electrical motor.

BACKGROUND OF THE INVENTION

In a series hybrid drive system, the vehicle is driven only with an electrical motor and the engine only drives the generator in order to supply electrical power to the electrical motor.

However, the engine in this type of series hybrid drive system is operated to rotate in a steady state in order to generate an approximately fixed amount of electrical power for supplying the electrical motor and excess electrical power being used to charge a battery. The vehicle may encounter running conditions which vary sharply, for example, during acceleration. Since the generated amount of electrical power may be insufficient under these conditions, it is necessary to provide a large capacity battery to compensate for the shortfall. As a result, the size and weight of the battery is increased.

SUMMARY OF THE INVENTION

It has been proposed to calculate the electrical power consumed by the electrical motor for vehicle running and to control the engine and generator in order to generate a corresponding amount of electrical power by the Japanese Patent Application No. 11-172426.

When the amount of electrical power consumed by the electrical motor corresponds with the amount of electrical power generated by the generator, the battery capacity may be kept to a minimum and it is possible to downsize the battery and reduce costs.

However although a relatively accurate correspondence of the power generated by the generator and the power consumed by the motor is possible when the vehicle is running under steady-state conditions, there is often a shortfall in the generated amount of power during vehicle acceleration or the like and thus it is necessary to compensate the required amount of power with the battery.

This is as a result of the following reasons. Due to the inertial weight of the rotating components of the generator or engine, a part of the engine output is used in order to increase the rotation speed of the rotating components of the generator and the engine-itself when acceleration is required. That is to say, a part of energy is consumed in order to increase the inertial energy of the rotating components, therefore the amount of generated power is reduced to that extent.

Thus the generated amount of electrical power will be less than the power requirements of the electrical motor. This deficit in the generated amount of electrical power must be compensated for by a battery and thus the battery must have a correspondingly large capacity.

It is therefore an object of this invention to make the generated power of the generator accurately correspond to the consumed electrical power as drive output of the electrical motor even under transient running conditions such as acceleration.

It is a further object of this invention to minimize a required battery capacity.

In order to achieve above the objects this invention provides a controller for a vehicle which has an engine, a generator connected to the engine, an electrical motor connected to the vehicle drive shaft and a battery electrically connected to the generator and the electrical motor, the controller comprises sensors to detect operational conditions of the vehicle, and a microprocessor. The microprocessor is programmed to calculate a first parameter showing a target output of the electrical motor based on operational conditions of the vehicle, to calculate a second parameter showing a target output of the engine based on the first parameter, to calculate a third parameter showing a target rotation speed of the generator based on the second parameter, to calculate a fourth parameter showing a generated output of the generator based on the second parameter, to calculate a fifth parameter showing a target output of the electrical motor by limiting the first parameter in response to the fourth parameter, to control the operation of the engine based on the second parameter, to control the operation of the generator based on the third parameter, and to control the operation of the electrical motor based on the fifth parameter.

The details as well as other features and advantages of the invention are set forth in the remainder of the specification and are shown in the accompanying drawings.

BRIEF DESCRIPTION OF THE DRAWINGS

FIG. 8 is a time chart showing the effects of applying this invention.

PREFERRED EMBODIMENTS OF THE INVENTION

Figure 1:
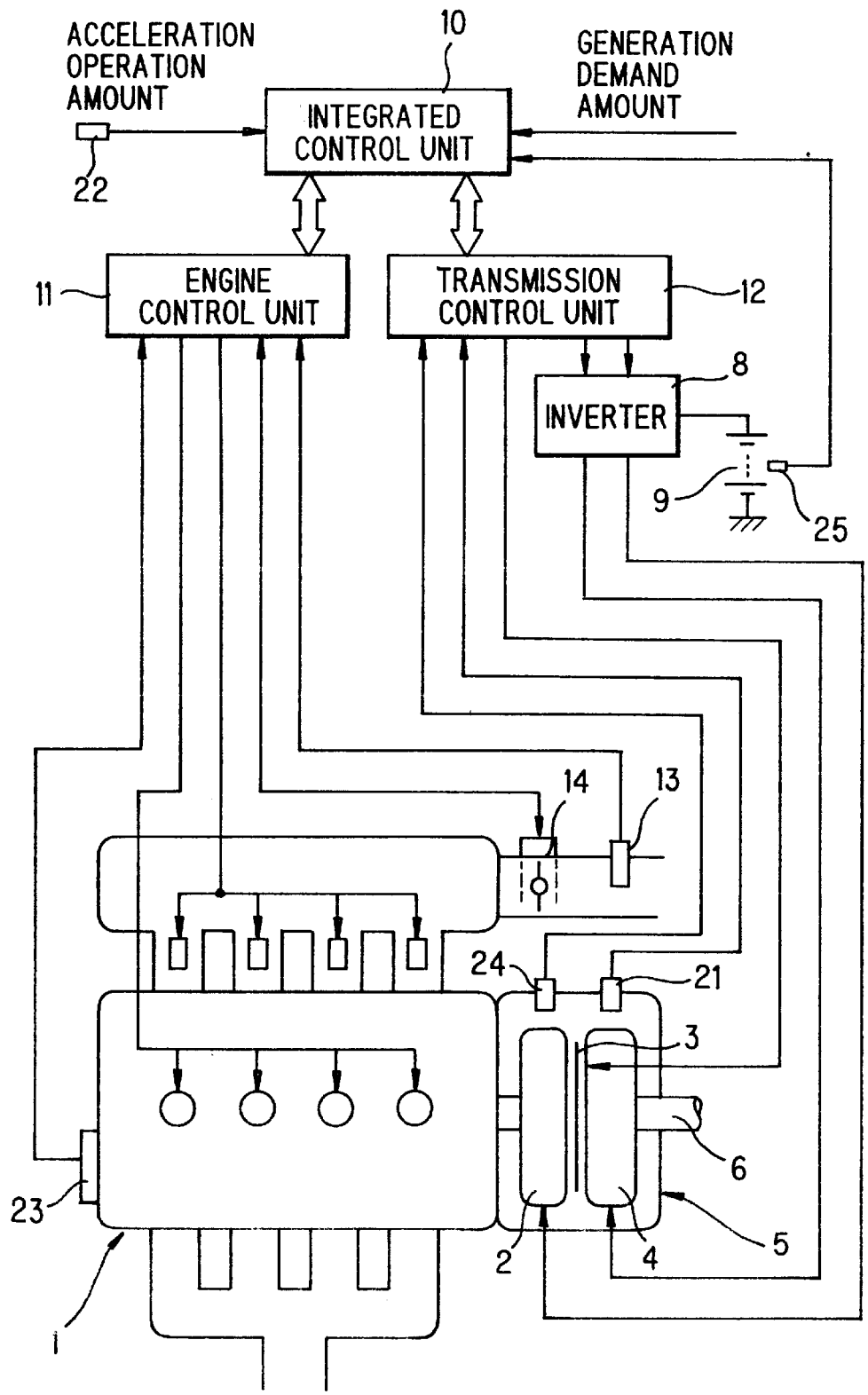
FIG. 1 shows a hybrid drive system according to a first embodiment of this invention.

FIG. 1 shows a hybrid driving system according to a first embodiment of this invention.

An engine 1 and an electrical power train 5 which functions as a continuously variable transmission are provided in this drive system.

The electrical power train 5 comprises a generator 2 and an electrical motor 4. The generator 2 is connected to the crankshaft of the engine 1 and the electrical motor 4 is connected to the vehicle drive shaft 6.

The generator 2 and electrical motor 4 are comprised an alternating current mechanism such as an alternating current synchronous motor provided with permanent magnets. The generator 2 and the electrical motor 4 are electrically connected with an inverter 8 respectively. A battery 9 which is a lithium battery, a nickel hydrogen battery or the like is electrically connected to the inverter 8.

Thus when the generator 2 is driven by the engine 1, the electrical motor 4 rotates when supplied with electrical power generated in this manner. Consequently the drive shaft 6 rotates and the vehicle is driven.

A clutch 3 is interposed between the generator 2 and the electrical motor 4. When the clutch 3 is engaged, the engine 1 and drive shaft 6 are directly engaged and it is possible to rotate the drive shaft 6 directly with the engine 1. The clutch 3 is engaged for example when the output shaft rotation speed equals the input shaft rotation speed in the electrical power train 5. In this state, loss in the generator 2 and the electrical motor 4 is low and running efficiency is high.

The rotation speed ratio of the input shaft to the generator and output shaft to the motor of the electrical power train 5 represents the speed ratio of the electrical power train 5.

An integrated control unit 10, engine control unit 11 and transmission control unit 12 are provided in order to control the engine 1 and the electrical power train 5.

Each control unit is comprised as a microprocessor with I/O interface, CPU, ROM, and RAM.

The integrated control unit 10 basically calculates a drive force required by the driver based on the accelerator operational amount, vehicle speed or the like. Thereafter the unit 10 controls the output torque generated by the electrical motor 4 through the transmission control unit 12 in order to realize a required drive force. At the same time, the rotation speed of the generator 2 is controlled through the transmission control unit 12 so that a generated electrical power is obtained which corresponds to the drive output (consumed electrical power) of the electrical motor 4. Furthermore at the same time, the torque generated by the engine 1 is controlled through the engine control unit 11.

The integrated control unit 10 calculates a command value for the generator 2 and a command value for the electrical motor 4 so that the drive output of the electrical motor 4 corresponds with the generated electrical power of the generator 2 in order to keep the required battery capacity to a minimum. This calculation makes allowances for energy consumption requirements resulting from increases in the rotational energy of the engine 1 and the generator 2, as described in detail below, so that the drive output corresponds with the generator output even in transient conditions involving increases in rotation speed such as during acceleration.

Each control unit receives detection signals from various sensors showing operational conditions to carry out the control routines described above.

An input shaft rotation speed sensor 24 and an output rotation shaft speed sensor 21 are mounted on the electrical power train 5. The input shaft rotation speed sensor 24 detects a rotation speed Ni (input shaft rotation speed) of a rotating element of the generator 2 connected to the engine 1. The output rotation shaft speed sensor 21 detects a rotation speed No (output shaft rotation speed) of a rotating element of the electrical motor 4 connected to the drive shaft 6.

A crank angle sensor 23 which detects a crank angle and an air flow meter 13 which detects an aspirated air amount are provided in the engine 1. An accelerator operation sensor 22 which detects an operational amount of the accelerator and a temperature sensor 25 which detects battery temperatures are also provided.

An electronically-controlled throttle valve 14 which is controlled by the engine control unit 11 is provided in an intake passage of the engine 1. The throttle valve 14 is opened and closed independently to the operation of the accelerator pedal by the driver in order to realize a target engine torque set in response to a required generated electrical power.

Figure 2:
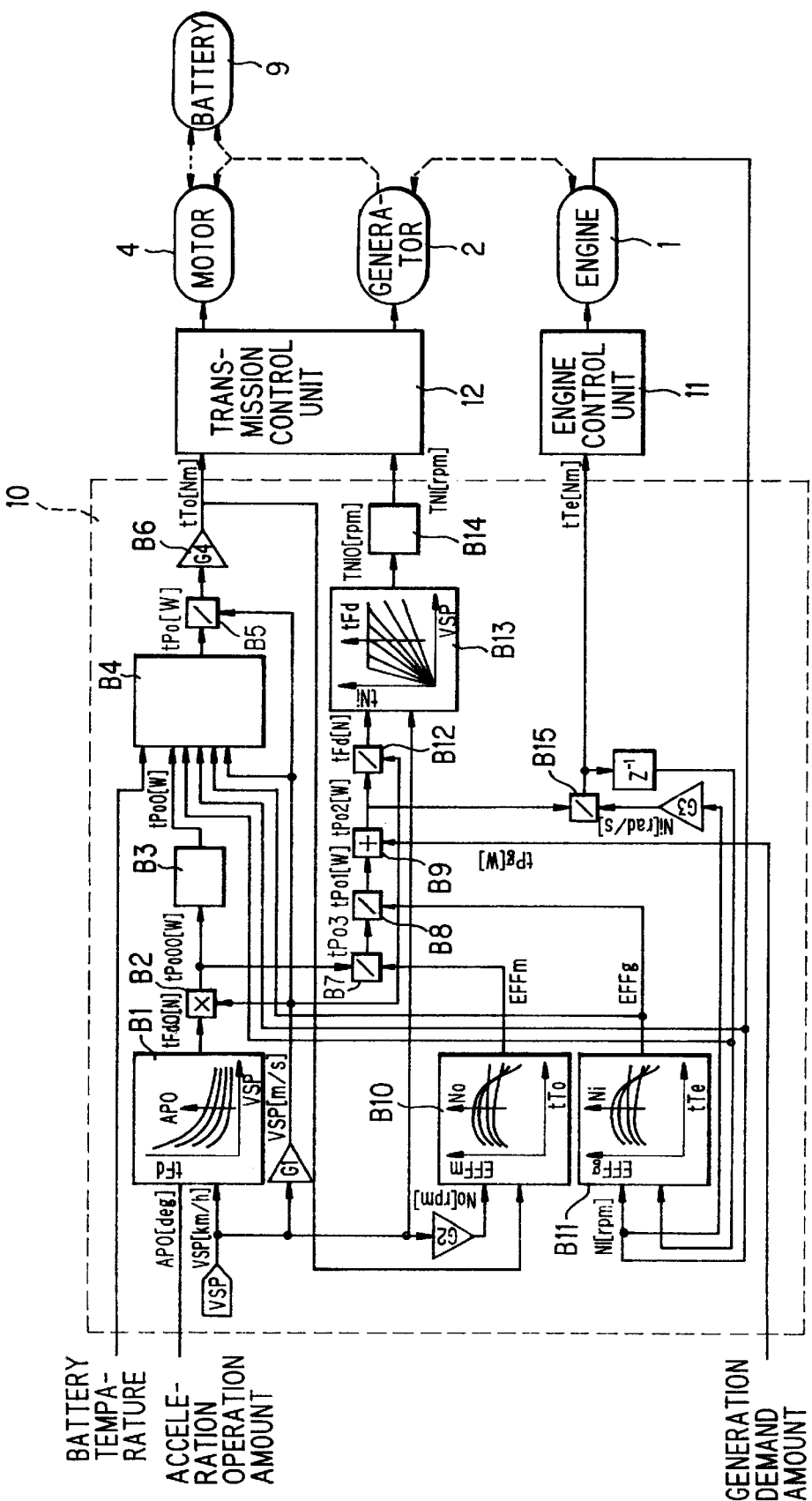
FIG. 2 is a block diagram of a control process performed by an integrated control unit in a first embodiment of this invention.

FIG. 2 is a block diagram of a control process performed by an integrated control unit 10 in a first embodiment of this invention.

A calculation part B1 of the integrated control unit 10 calculates a first parameter (force) tFd0[N] referring to a map as shown in the figure. The parameter (force) is based on an operation amount APO[deg] of the accelerator pedal and a vehicle speed VSP[km/h] calculated on the basis of the rotation speed No of the output shaft of the electrical power train 5.

The first parameter (force) tFd0[N] means the drive force required by the driver.

A calculation part B2 calculates a first parameter (power) tPo00[W] by multiplying vehicle speed VSP[km/h] by a constant G1=1000/3600 to obtain VSP[m/s] and thereafter multiplying VSP[m/s] by the first parameter (force) tFd0[N].

The first parameter (power) tPo00[W] represents the power required by the driver, in order words, power which must be generated by the electrical motor 4. Since electrical power of the generator 2 is calculated by a calculation part B7 which is described below based on the first parameter (power) tPo00[W], this value may be regarded as a basic value for generated power.

A calculation part B3 applies a filtering process to the first parameter (power) tPo00[W] and calculates a value tPo0 [W]. The filtering process is a delayed processing using a secondary filter.

Since the control response speed of the generator 2 and the electrical motor 4 is more rapid that the control response speed of the engine 1, delay processing is applied so that the three above response times coincide. Although delay processing is performed on the command value of the generator 2 by a calculation part B14, the filter used in the calculation part B14 is the same filter as used in the calculation part B3.

Limiting process is performed in a limiting part B4 on the first parameter (power) tPo0[W] after the filtering process above.

The process performed by the limiting part B4 will be described in detail later, however in this part B4, an actual generator output is estimated. A fifth parameter (power) tPo[W] is calculated by limiting process is performed on the first parameter (power) tPo0[W] after the filtering process above so that the difference of the above estimated value, that is to say, the actual generator output and the drive output falls in a predetermined range. The fifth parameter (power) tPo[W] is a target power for controlling the output of the electrical motor 4.

The reason for performing the limiting process of the limiting part B4 after the filtering process of the calculation part B3 is as follows. Since the actual generator output at a particular time is estimated in this limiting process based on operational conditions of the engine 1 and the generator 2 which are themselves constantly varying, the process result must be reflected immediately in the calculation of a fifth parameter (torque) tTo[Nm] which is described below.

The integrated control unit 10 divides the fifth parameter (power) tPo[W] calculated by the limiting part B4 with vehicle speed VSP[m/s] in a calculation part B5. Furthermore in a calculation part B6, the fifth parameter (torque) tTo[Nm] is calculated by multiplying a constant G4 [that is to say, the constant G4=(drive wheel effective radius)/(final braking gear ratio)] by the result of the above calculation step.

The fifth parameter (torque) tTo[Nm] is fed to the transmission control unit 12 and the transmission control unit 12 control the generated torque of the electrical motor 4 on this basis.

In order to enable the electrical motor 4 to generate a power to correspond to the first parameter (power) tPo00, the integrated control unit 10 uses a calculation part B7 to calculate a parameter tPo3 representing electrical power consumed by the electrical motor 4 by dividing the first parameter (power) tPo00[W] by an efficiency EFFm of the electrical motor 4. The parameter tPo3 is a parameter showing the target generated power of the generator 2.

A calculation part B8 calculates a second parameter (power) tPo1[W] by dividing the parameter tPo3 with an efficiency EFFg of the generator 2. The second parameter (power) tPo1[W] is the power which must be generated by the engine 1 when the generator 2 is commanded to generate power corresponding to tPo3.

A calculation part B9 adds an external generator required value tTg (a generated amount required by electrical components such as the ignition components or the lights) to the second parameter (power) tPo1[W] and calculates a second corrected parameter (power) tPo2[W].

The efficiency EFFm of the electrical motor 4 is calculated in a calculation part B10 referring to a map as shown in the figure based on the operational conditions (fifth parameter (torque) tTo and output shaft rotation speed No) of the electrical motor 4.

The efficiency EFFg of the generator 2 is calculated in a calculation part B11 referring to a map as shown in the figure based on the operational conditions (second parameter (torque) tTe and input shaft rotation speed Ni) of the generator 2.

The integrated control unit 10 uses a calculation part B12 to convert the second corrected parameter (power) tPo2[W] to a second parameter (force) tFd[N] by dividing it by the vehicle speed VSP[m/s] at that time. Then a calculation part B13 calculates a third parameter tNi0[rpm] referring to an output distribution map as shown in the figure based on the second parameter (force) tFd[N] and vehicle speed VSP[km/h].

The third parameter tNi0[rpm] is the target rotation speed of the generator 2.

A calculation part B14 calculates the third parameter tNi0[rpm] with a filter process on the third parameter tNi0[rpm] using the same type of filter as that used on tPo0. The third parameter tNi[rpm] is fed to the transmission control unit 12.

The transmission control unit 12 controls the rotation of the generator 2 based on the third parameter tNi0[rpm].

The third parameter tNi0[rpm] may also be calculated by a table of predetermined relationships based on the second corrected parameter (power) tPo2[W] above.

The integrated control unit 10 uses a calculation part B15 to calculate a second parameter (torque) tTe[Nm] by dividing the second corrected parameter (power) tPo2[W] by an input shaft rotation speed Ni (=engine rotation speed). This value is fed to the engine control unit 11.

The engine control unit 11 controls the engine output based on the second parameter (torque) tTe[Nm].

The generator 2 is rotated by torque generated by the engine 1 and electrical power which is generated by the generator 2 is supplied to the electrical motor 4 which thus generates a drive torque. When the generator output is insufficient, the electrical power is supplemented by the battery 9.

Figure 3:
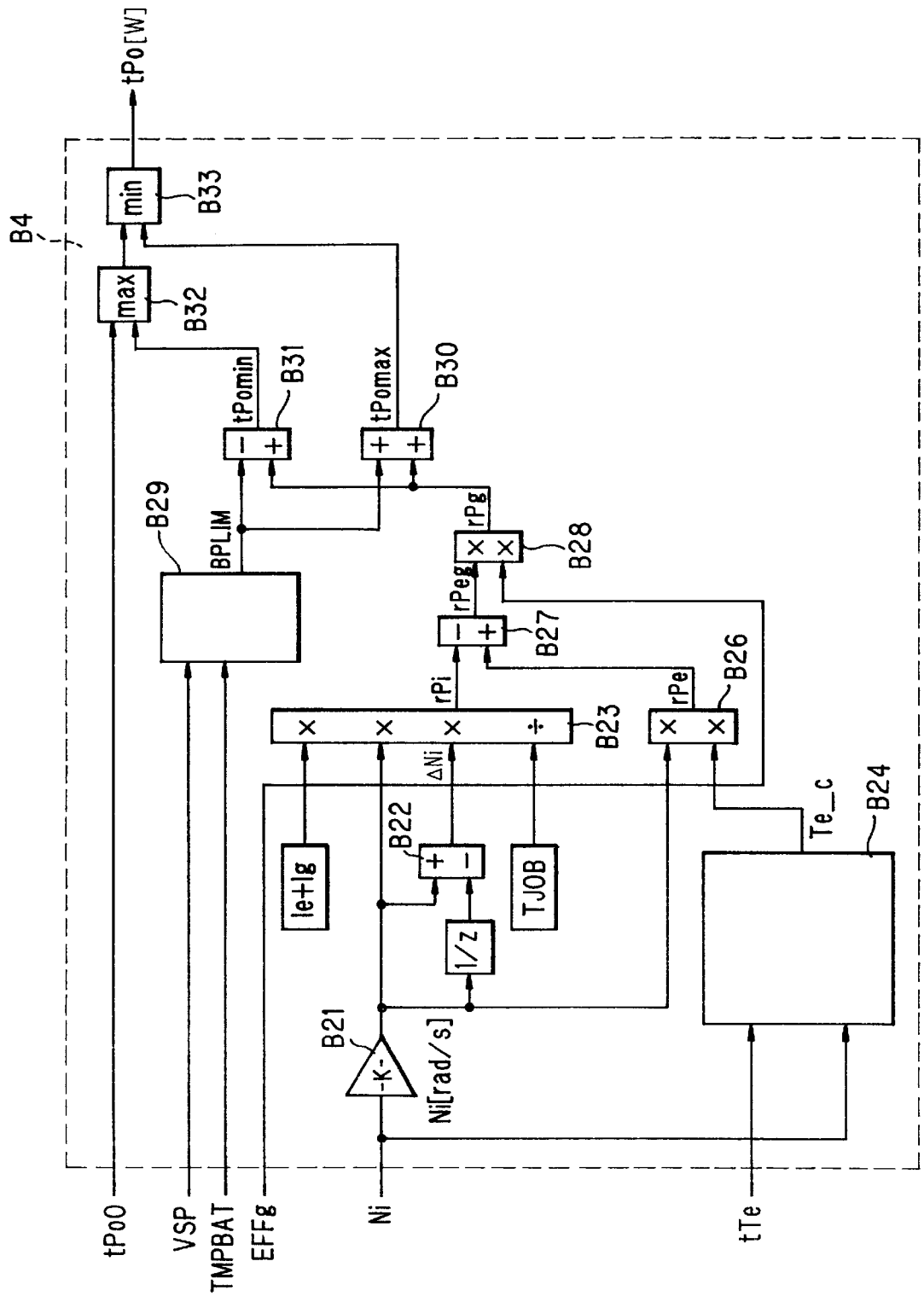
FIG. 3 is a block diagram of a limiting process on a target generator output in a first embodiment of this invention.

FIG. 3 is a block diagram of a limiting process performed by the limiting part B4 described above.

A first parameter (power) tPo0[W] after filtering process used for calculation of the fifth parameter (torque) tTo[Nm] is suitably limited based on the relationship of electrical power and the equation of motion of the engine 1 and generator 1.

The equation of motion of rotating components of the engine 1 and the generator 2 is expressed by Equation (1).

$$Te+Tg=(Ie+Ig)\cdot\omega' \quad (1)$$

Where:
Te: engine torque,
Tg: generator torque,
Ie: inertial moment of the engine rotating components,
Ig: inertial moment of the generator rotating components,
Pg: generator output,
Po: electrical motor output (drive output),
Pb: battery output,
η: generator efficiency.

In the above equation, (ω' is the differential value (angular velocity) of the angular velocity ω of the engine 1 and the generator 2.

The generator output Pg is expressed by Equation (2).

$$Pg=Tg\cdot\omega\cdot\eta \quad (2)$$

The relationship between output of the generator 2, electrical motor 4 and the battery 9 is expressed by Equation (3).

$$Pg+Po=Pb \quad (3)$$

When the allowable output range of the battery 9 is defined as, $$-Pb\max \leq Pb \leq Pb\max \quad (4)$$

the relationship below is given by Equations (1) to (4).

$$\{Te\cdot\omega-(Ie+Ig)\cdot\omega\cdot\omega'\}\cdot\eta-Pb\max \leq Po \leq \{Te\cdot\omega-(Ie+Ig)\cdot\omega\cdot\omega'\}\cdot\eta+Pb\max \quad (5)$$

It is necessary that the electrical motor output (drive output) Po satisfies the Equation (5). Thus a first parameter (power) tPo0[W] after filtering process must be limited to satisfy the Equation (6).

$$\{Te\cdot\omega-(Ie+Ig)\cdot\omega\cdot\omega'\}\cdot\eta-Pb\max \leq tPo \leq \{Te\cdot\omega-(Ie+Ig)\cdot\omega\cdot\omega'\}\cdot\eta+Pb\max \quad (6)$$

Precise details of the processing will be described with reference to FIG. 3.

Firstly in a calculation part B21, the units [rpm] of the input shaft rotation speed Ni are converted to [rad/s] by being multiplied by a constant K. In a calculation part B22, the difference ΔNi of the converted value and the immediately previous value is calculated. Furthermore, the calculation part. B23 calculates a seventh parameter rPi[W] based on the Equation below using the value for ΔNi.

$$rPi[W]=(Ie+Ig)\times Ni\times(\Delta Ni/TJOB)$$

Where: TJOB is the calculation period.

A seventh parameter rPi[W] expresses the work ratio corresponding to a variable amount in the kinetic energy of rotating components of the engine 1 and the generator 2.

An estimation part B24 estimates a sixth parameter (torque) $Te_{13}$ c[Nm] taking into account the response of engine torque based on the second parameter (torque) tTe [Nm] and the input shaft rotation speed Ni (=engine rotation speed).

A calculation part B26 calculates a sixth parameter (power) rPe[W] by multiplying an input shaft rotation speed Ni by the estimated calculation result.

The sixth parameter (torque) Te_c[Nm] and the sixth parameter (power) rPe[W] express the actual power or torque generated by the engine 1 at that time.

The processing routine of the estimation part B24 will be described in the later.

A calculation part B27 calculates the difference rPeg[W] between the seventh parameter (power) rPi[W] and the sixth parameter (power) rPe[W].

This corresponds to a value calculated by subtracting the amount used in the kinetic energy variation of the rotating components of the engine output. That is to say, it corresponds to the power actually used in power generation.

A calculation part B28 calculates a fourth parameter (power) rPg[W] expressing actual generated power by multiplying the generator efficiency EFFg by the difference rPeg[W] above.

The calculation part B29 which calculates an allowable output amplitude calculates an allowable fluctuation amplitude ±BPLIM in response to a battery temperature TMPBAT and vehicle speed VSP.

The calculation part B30 adds the allowable fluctuation amplitude BPLIM to the fourth parameter (power) rPg[W] and calculates an upper limit tPomax[W]. The allowable fluctuation amplitude BPLIM is subtracted from the fourth parameter (power) rPg[W] in the calculation part B31 in order to calculate a lower limit tPomin [W].

The calculation parts B32 and B33 limit the first parameter (power) tPo0[W] after filtering process to a range between these upper and lower limits to calculate a fifth parameter (power) tPo[W].

When kick-down acceleration (the gear automatically shifts down) is performed in a conventional mechanical automatic transmission, vehicle acceleration is decreased to the extent that the actual kinetic energy of the engine or the fly wheel is increased.

When the allowable fluctuation amplitude is set to a small value, the electrical motor output is limited, and a similar phenomenon to the above results. However the driver does not become uneasy since this is a similar phenomenon to a vehicle provided with a conventional transmission.

In this case, the electrical power required from the battery 9 to supplement the electrical motor 4 is small.

In contrast, when the allowable fluctuation amplitude is set to a large value, the target power of the electrical motor 4 is not limited and as a result, the acceleration response is more rapid. At this time, electrical power related to the increase in the kinetic energy of the rotating components is supplied from the battery 9. When the battery 9 can supply a relatively large amount of electrical power, it is possible to obtain kinetic characteristics having excellent acceleration response characteristics by setting the allowable fluctuation amplitude to a large value.

The allowable fluctuation amplitude is set to vary with respect to the battery temperature and the vehicle speed.

Figure 4:
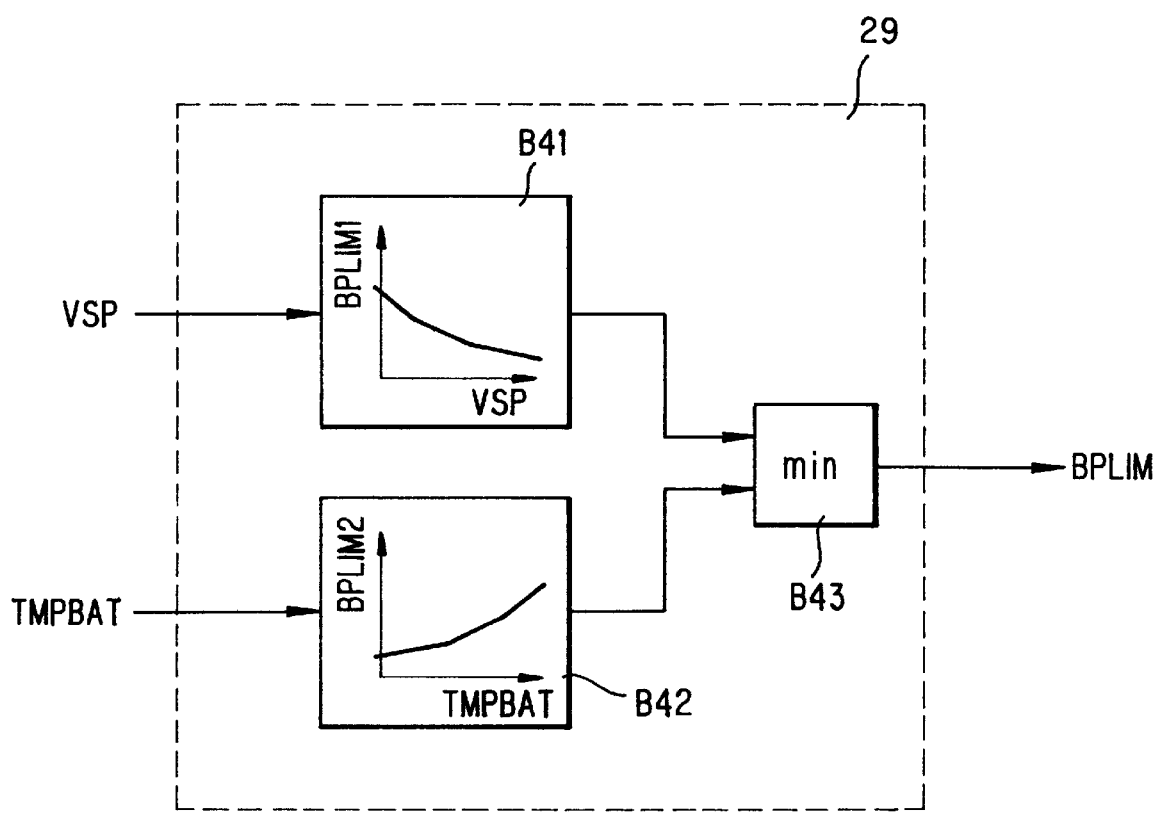
FIG. 4 is a block diagram of calculation process for an allowable fluctuation amplitude.

FIG. 4 is a block diagram showing a calculation process of a calculation part B29 with respect to the allowable output fluctuation amplitude in FIG. 3.

In this manner, a calculation part B41 calculates a first allowable fluctuation amplitude BPLIM1 in response to a vehicle speed VSP. A calculation part B42 calculates a second allowable fluctuation amplitude BPLIM2 in response to a battery temperature TMPBAT.

The first allowable fluctuation amplitude BPLIM1 is set to a value which increases as the vehicle speed VSP decreases. The second allowable fluctuation amplitude BPLIM2 is set to a value which increases as the battery temperature TMPBAT increases.

A calculation part B43 sets the smaller of the two values as the allowable fluctuation amplitude BPLIM. The allowable fluctuation amplitude varies with respect to vehicle speed VSP. The reason why the value increases as vehicle speed decreases is as follows. For example, when the vehicle is stopped, that is to say, when the vehicle is stationary and idling, and thereafter commences motion from that state, electrical power is consumed not only for the drive output of the electrical motor 4 but also so that the generator 2 starts the engine 1. As a result, electrical power is consumed by both the electrical motor 4 and the generator 2. Thus the battery 9 must have a larger battery output than during normal running.

On the other hand, during normal running, since it is necessary to reduce consumption of electrical power from the battery 9 as much as possible, in low vehicle-speed regions, even when the allowable fluctuation amplitude is large, the allowable fluctuation amplitude decreases as the vehicle speed increases.

The reason for why the allowable fluctuation amplitude varies with respect to battery temperature TMPBAT is because the allowable output of the battery 9 decreases when the battery temperature is low. As a result, excess load is not applied on the battery 9 when the battery temperature is low due to the fact that the allowable fluctuation amplitude is set to small values as the battery temperature decreases.

The allowable fluctuation amplitude BPLIM is set in consideration of both the vehicle speed VSP and the battery temperature TMPBAT However the allowable fluctuation amplitude BPLIM may be set in consideration of other parameters affecting the output characteristics of the battery (for example, degree of deterioration, charging ratio, etc).

The allowable fluctuation amplitude is set about a generator output estimated value and is set equally about that value at both larger and smaller values. However it is possible to set the allowable fluctuation amplitude to be biased towards either larger or smaller values.

Figure 5:
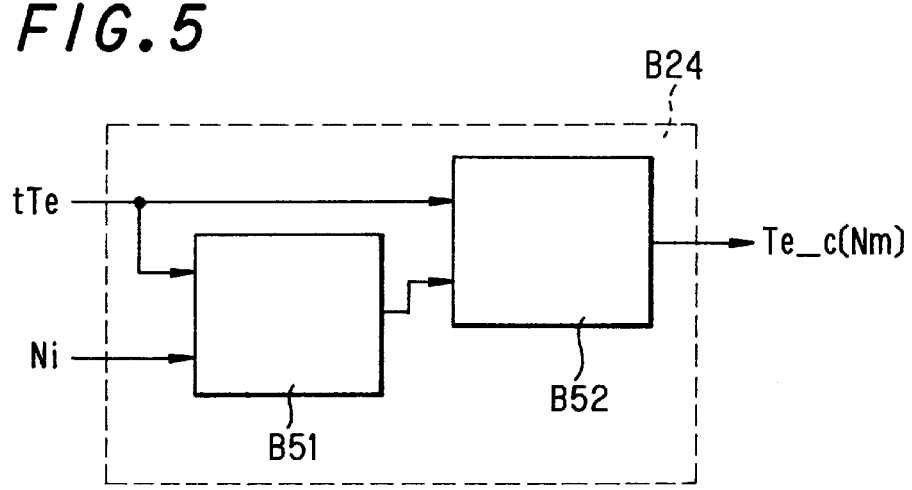
FIG. 5 is a block diagram of a control process performed by an engine torque estimation part.

FIG. 5 is a block diagram of a control process of the estimation part B24 of FIG. 3.

The estimation part B24 comprises a calculation part B51 for a response time constant and a calculation part B52 from an estimation value.

Figure 6:
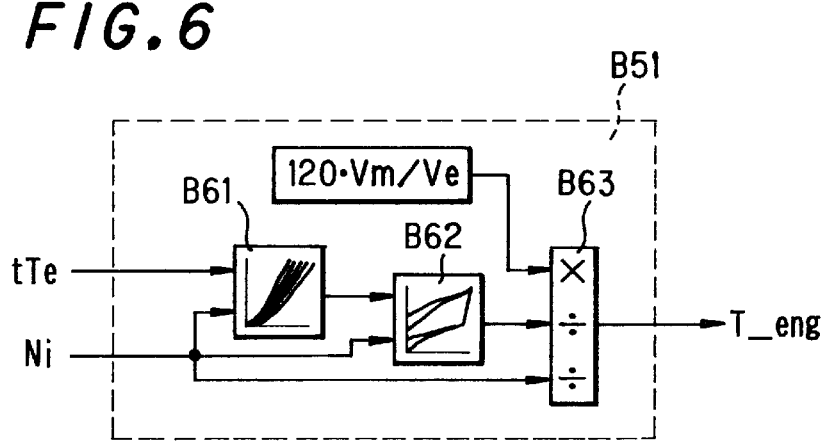
FIG. 6 is a block diagram of a control process performed by a response time constant calculation part.

The details of the response time constant calculation part B51 are shown in FIG. 6.

The calculation part B61 calculates a volume efficiency of the engine 1 based on the second parameter (torque) tTe [Nm] and the input shaft rotation speed Ni (=engine rotation speed).

The volume efficiency of the engine is obtained by calculating a target throttle aperture from the second parameter (torque) tTe[Nm] and the input shaft rotation speed Ni. An aperture surface area of the air intake passage is calculated from the throttle aperture and thus the volume efficiency is calculated from the aperture surface area, the engine rotation speed and the engine capacity. However herein, this is calculated by reference to a predetermined volume efficiency calculation map.

The calculation part B62 calculates a fresh air ratio ηn in the cylinder from the calculated integral efficiency and the input shaft rotation speed Ni by referring to a predetermined map.

The calculation part B63 then calculates a response time constant T_eng of the engine 1 based on Equation (7) from an air intake system model for the engine 1.

$$T\_eng = 2 \cdot Vm/(Ve \cdot \eta n \cdot Ni) \times 60 \qquad (7)$$

Where:
- Vm: air intake system capacity,
- Ve: cylinder volume,
- ηn: fresh air ratio,
- Ni: input shaft rotation speed (=engine rotation speed) [rPm].

Figure 7:
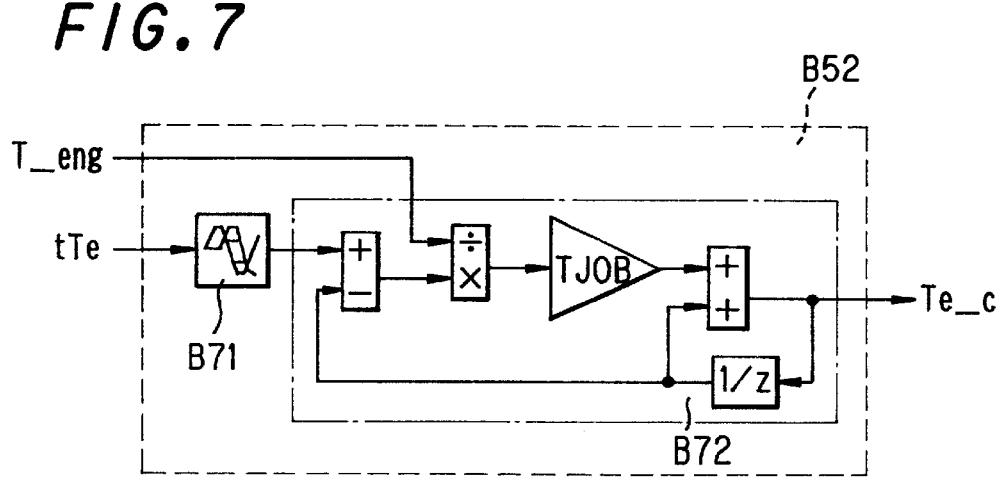
FIG. 7 is a block diagram of a control process performed by an torque estimation calculation part.

A calculation part B52 for the estimated value which is placed in a step after the calculation part B51 calculates the response time constant in FIG. 5. Engine torque is estimated as shown in FIG. 7 based on a model of adding ineffectual time to primary delay.

In ineffectual time processing which is performed by the calculation part B71, a constant calculated as ineffectual time is based on the ineffectual response time of the electronically throttle valve 14 and the ineffectual response time of the injection valve.

A response time constant T_eng calculated by the response time constant calculation part B51 is used by a primary delay processor B72 encompassed by the broken line.

On the basis of the above steps, a sixth parameter (torque) Te_ct[Nm] is estimated.

The operation of this invention resulting from the above control routine will be described below. In particular, the operation will be described when the driver depresses the accelerator pedal sharply and the accelerator operation amount varies in a step-wise manner using FIG. 8.

The case when this is applied to this invention and the case when this is not applied to this invention (conventional control) will be compared.

When a vehicle is operating in a steady state, for example, at a constant speed, it is possible to make the generator output coincide with the drive output of the electrical motor 4 (=consumed electrical power).

In contrast, when the rotation speed is rising for example during acceleration, a part of the engine output is used as energy for increasing the rotation speed of the engine 1 and the generator 2. Thus the generator output is smaller than the engine output. Furthermore since the drive output of the electrical motor 4 is controlled with respect to a target value, it is necessary to supplement the output with a large electrical power from the battery 9.

Figure 8A:
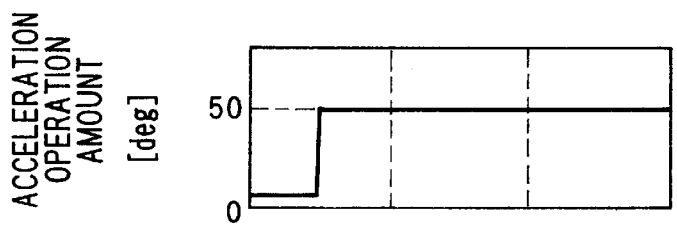
FIGS. 8(a)–8(h) are time charts showing the effects of applying this invention.
Figure 8B:
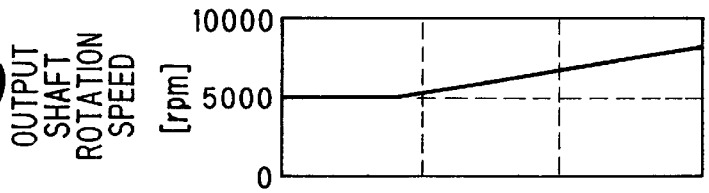
Figure 8C:
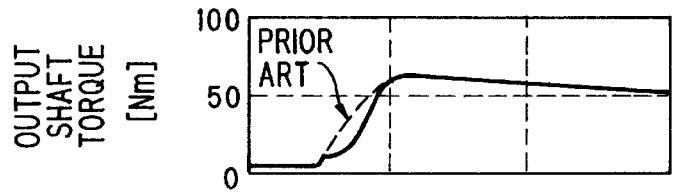
Figure 8D:
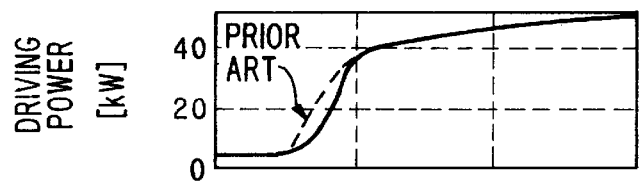
Figure 8E:
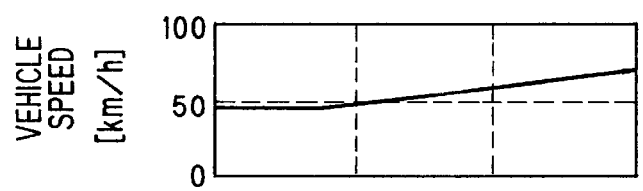
Figure 8F:
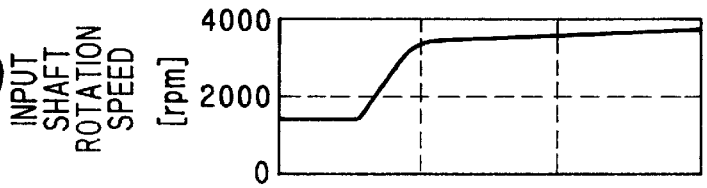
Figure 8G:
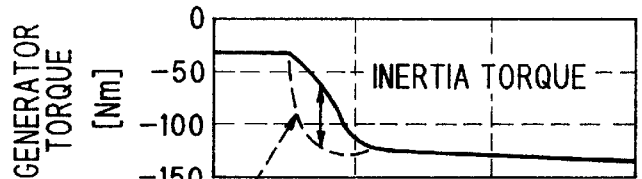
Figure 8H:
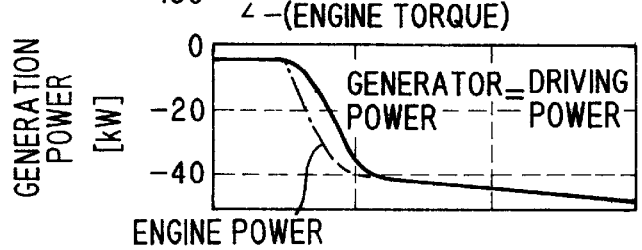

However during acceleration, this invention reduces the drive output (target drive force) (FIG. 8(d)) of the electrical motor 4 together with the decrease (FIG. 8(h)) in the generator output which depends on the variation in the inertial kinetic energy of the engine 1 and the generator 2.

When a large amount of energy is used in increasing the rotation speed of the engine and the generator, the target drive output of the electrical motor 4, that is to say, the consumed electrical power is limited correspondingly. Thus even when the actual generator output is reduced during acceleration, the drive output of the electrical motor 4 can be made to approximately coincide with this value.

As a result, it is possible to either reduce the auxiliary electrical power to a minimum or alternatively it is not necessary to supply the shortfall in electrical power from the battery 9.

However in the conventional system, the drive output of the electrical motor during acceleration is not corrected since the energy used to increase the rotation of the generator and the engine is not considered.

That is to say, as shown in FIG. 8(d) by the broken line, the drive output of the electrical motor is controlled in order to maintain the characteristics required only on the basis of the acceleration depression amount. Thus there is a large deviation from the generator output, that is to say, the generated electrical power is insufficient to satisfy the drive output required of the electrical motor. Therefore it is necessary for a large capacity battery to be provided in order to compensate for the shortfall, as a result, although the size of the battery is increased.

However in this invention since the consumed energy normally coincides with the generator output, a small capacity battery is sufficient for operational purposes which thus decreases costs.

Although the above description describes an example of adapting this invention, the invention is not limited in this respect. In particular, several variations on this invention are possible as shown in the block diagrams. For example, although the first parameter (power) tPo0[W] is limited, as described hereafter, the same effect is obtained even when the first parameter (torque) tPo0[Nm] which controls drive torque of the electrical motor 4 is limited.

This embodiment will be described with reference FIG. 9 and FIG. 10.

Figure 9:
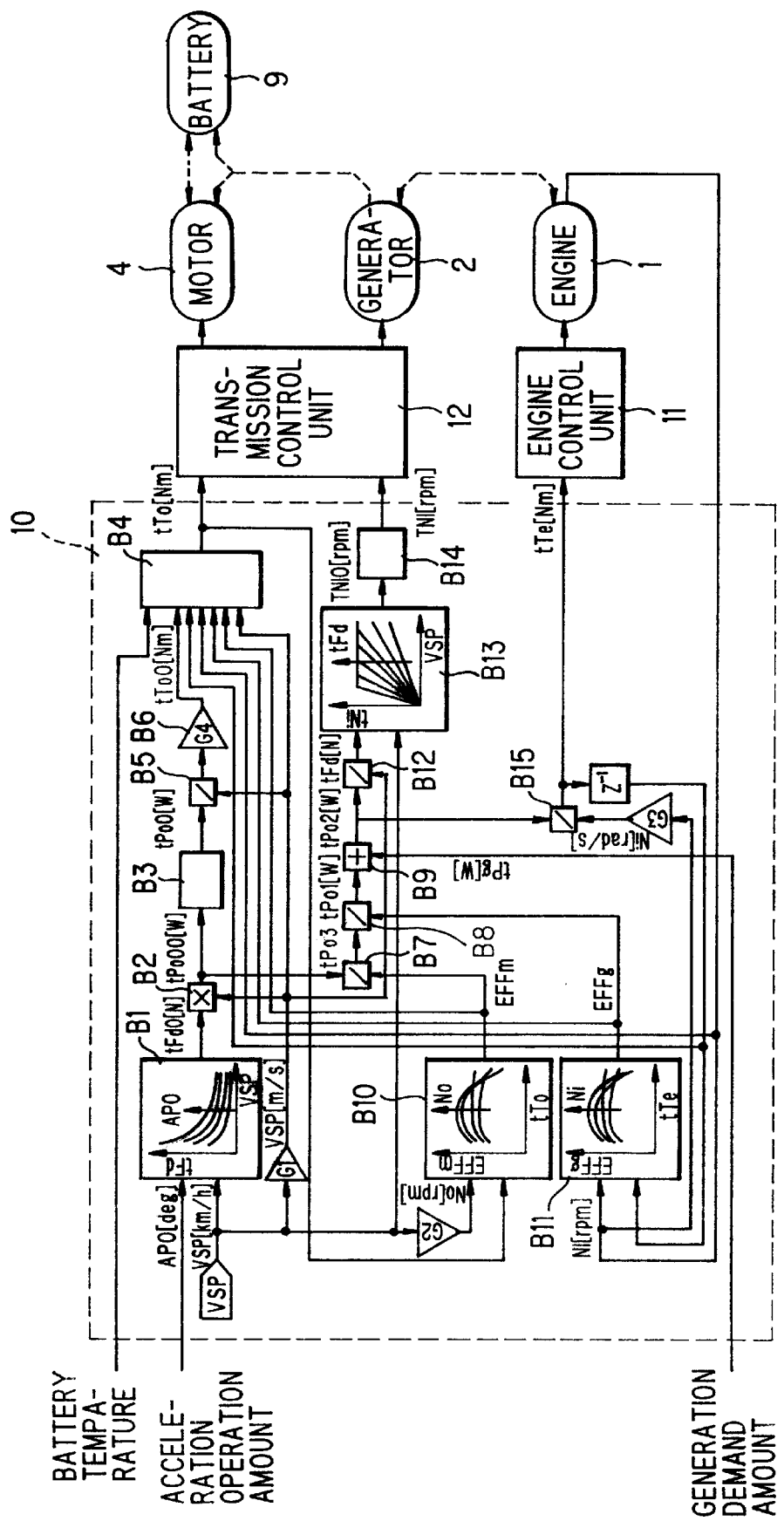
Figure 10:
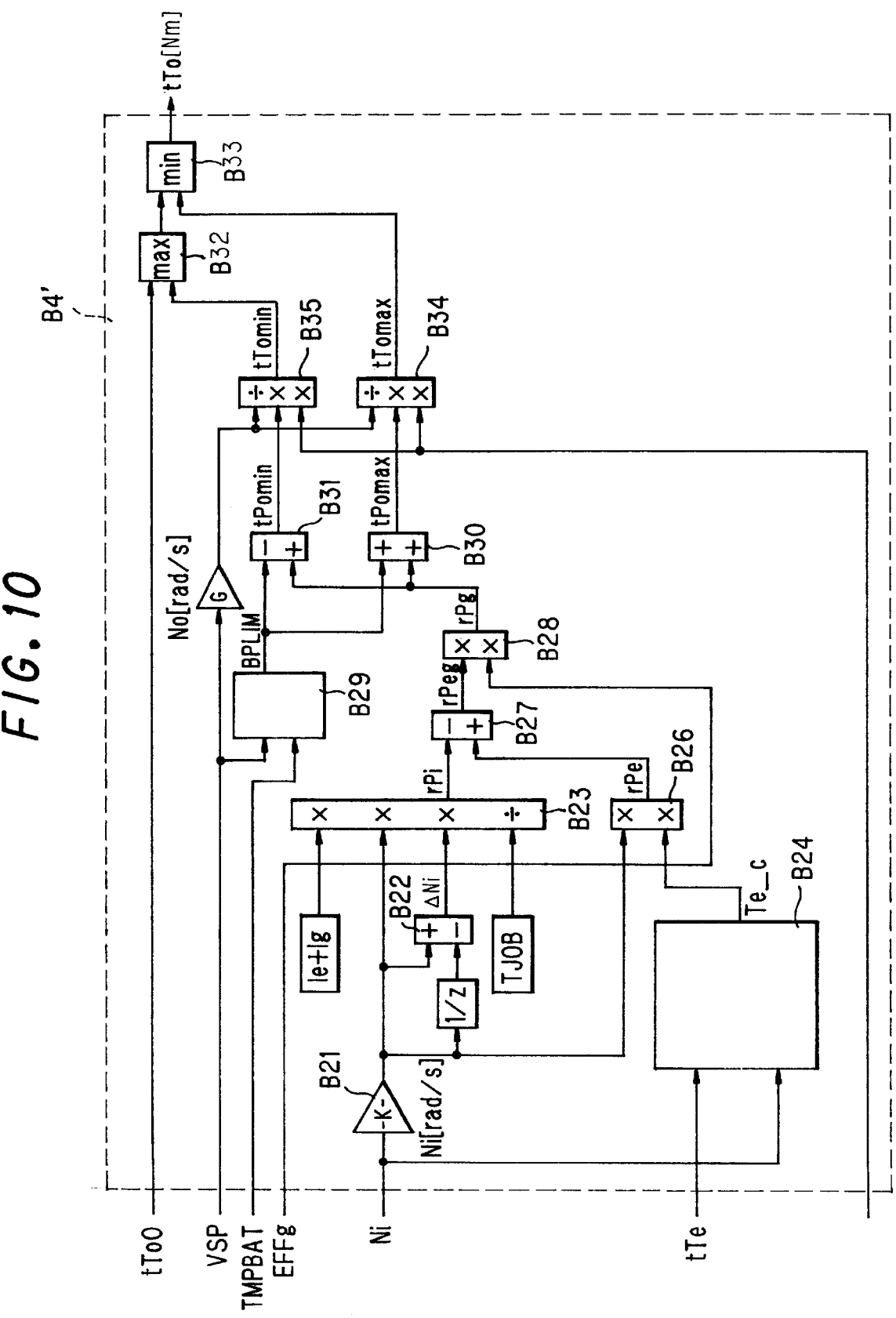
FIG. 10 is a block diagram showing a control process performed by a target output shaft torque limiting part in the above embodiment of this invention.

Many components in FIG. 9 and FIG. 10 are the same as those shown in FIG. 2 and FIG. 3 and are designated by the same reference numerals. Therefore additional description to the same will be omitted.

FIG. 9 is a block diagram showing a control proess of the integrated control unit 10. A limiter B4' is provided which limits the torque instead of the limiter B4 which limits the output of the electrical motor 4.

FIG. 10 shows a control process for a limiter B4'. In order to limit the first parameter (torque) tTo0[Nm] controlling the torque of the electrical motor 4 based on the fourth parameter (power) rPg[W] which controls the output of the generator 2, the upper limiting value tPomax and the lower limiting value tPomin which are calculated in the same way of the previous embodiment are multiplied by inverse of the electrical motor efficiency EFFm and the output shaft rotation speed No and converted to an upper limiting value tTomax and a lower limiting value tTomin (calculation part B34, B35). The first parameter (torque) tTo0[Nm] is limited the allowable region set on the basis of the above in order to calculate a fifth parameter (torque) tTo[Nm] (calculation part B32, B33).

Thus even when torque is limited rather than the output of the electrical motor 4, the control process is substantially the same. It is clear that this embodiment obtains the same operation as the above embodiments.

The characteristics as shown in FIGS. 8(c) and (g) express the control process as described in the second embodiment.

The entire contents of Japanese Patent Application P2000-104497 (filed Apr. 6, 2000) is incorporated herein by reference.

This invention is not limited to the above embodiments and various changes and modifications may be made in the invention without departing from the spirit and scope thereof.

What is claimed is:

1. A controller for a vehicle having an engine, a generator connected to the engine, an electrical motor connected to the vehicle drive shaft and a battery electrically connected to the generator and the electrical motor, comprising, sensors to detect operational conditions of the vehicle, and a microprocessor programmed to:
 calculate a first parameter showing a target output of the electrical motor based on operational conditions of the vehicle;
 calculate a second parameter showing a target output of the engine based on the first parameter;
 calculate a third parameter showing a target rotation speed of the generator based on the second parameter;
 calculate a fourth parameter showing a generated output of the generator based on the second parameter;
 calculate a fifth parameter showing a target output of the electrical motor by limiting the first parameter in response to the fourth parameter;
 control the operation of the engine based on the second parameter;
 control the operation of the generator based on the third parameter; and
 control the operation of the electrical motor based on the fifth parameter.

2. The controller as defined in claim 1, wherein the microprocessor is further programmed to:
 calculate a sixth parameter showing an actual output of the engine based on the second parameter,
 calculate a seventh parameter showing a work ratio corresponding to variation in the kinetic energy of the rotating components of the engine and the generator based on variation in the actual rotation speed of the engine and the generator; and
 calculate the fourth parameter based on the difference of the sixth parameter and the seventh parameter.

3. The controller as defined in claim 1, wherein the microprocessor is further programmed to:
 set an upper limiting value and a lower limiting value based on the fourth parameter, and
 limit the first parameter to a range between the upper limiting value and the lower limiting value in order to calculate a fifth parameter.

4. The controller as defined in claim 3, wherein the microprocessor is further programmed to:
 set the upper limiting value and the lower limiting value so that the difference of the limiting values from the fourth parameter respectively decreases as a vehicle speed increases.

5. The controller as defined in claim 3, wherein the microprocessor is further programmed to:
 set the upper limiting value and the lower limiting value so that the difference of the limiting values from the fourth parameter respectively decreases as a temperature of the battery decreases.

6. A controller for a vehicle having an engine, a generator connected to the engine, an electrical motor connected to the vehicle drive shaft and a battery electrically connected to the generator and the electrical motor, comprising,
 means for detecting operational conditions of the vehicle;
 means for calculating a first parameter showing a target output of the electrical motor based on operational conditions of the vehicle;
 means for calculating a second parameter showing a target output of the engine based on the first parameter;
 means for calculating a third parameter showing a target rotation speed of the generator based on the second parameter;
 means for calculating a fourth parameter showing a generated output of the generator based on the second parameter;
 means for calculating a fifth parameter showing a target output of the electrical motor by limiting the first parameter in response to the fourth parameter; and
 means for controlling the operation of the engine based on the second parameter, the operation of the generator based on the third parameter, and the operation of the electrical motor based on the fifth parameter.

7. A method for controlling the operation of a vehicle having an engine, a generator connected to the engine, and an electrical motor connected to a vehicle drive shaft, comprising the steps of:
 calculating a target output of the electrical motor based on operational conditions of the vehicle;
 calculating a target output of the engine based on the target output of the electrical motor;
 calculating a generated output of the generator based on the target output of the engine; and
 limiting the target output of the electrical motor in response to the generated output of the generator.

8. The method of claim 7, further comprising:
 calculating a target rotational speed of the generator based on the target output of the engine.

9. The method of claim 8, further comprising:
 controlling the operation of the generator based on the target rotational speed of the generator.

10. The method of claim 8, further comprising:
 calculating an actual output of the engine;
 calculating a work ratio corresponding to variation in the kinetic energy of rotating components of the engine and the generator based on variation in the actual rotational speed of the engine and the generator; and
 calculating a difference between the actual output of the engine and the work ratio.

11. The method of claim 7, further comprising:
 controlling the operation of the engine based on the target output of the engine.

12. The method of claim 7, further comprising:
 setting an upper limiting value and a lower limiting value based on the generated output of the generator; and
 limiting the target output of the electrical motor to a range between the upper limiting value and the lower limiting value.

13. The method of claim 12, wherein the step of setting an upper limiting value and a lower limiting value sets the upper limiting value and the lower limiting value so that limiting the target output of the electrical motor in response to the generated output of the generator respectively decreases as a vehicle speed increases.

14. The method of claim 12, wherein the step of setting an upper limiting value and a lower limiting value sets the upper limiting value and the lower limiting value so that limiting the target output of the electrical motor in response to the generated output of the generator respectively decreases as a battery temperature decreases.

* * * * *